Patented Mar. 31, 1942

2,277,854

UNITED STATES PATENT OFFICE 2,277,854

COLLOIDAL TERTIARY CALCIUM PHOSPHATE

Louis Paul Victor Lecoq, Neuilly-sur-Seine, France

No Drawing. Application May 10, 1939, Serial No. 272,919

15 Claims. (Cl. 167—72)

It has already been proposed to manufacture colloidal tertiary calcium phosphate by chemical means. The known methods rely upon precipitation of tertiary calcium phosphate in the presence of a support colloid. Casein has been most frequently selected for this purpose. From the known methods, it appears that the use of a colloid adjunct is deemed responsible for the colloidal character of the phosphate thus produced.

In contradistinction to the prior proposals, it is a primary object of my invention to produce colloidal solutions of tertiary calcium phosphate without resorting to use of a support colloid.

Another object is to produce by chemical means, ultrafine colloidal solutions of tertiary calcium phosphate, including no foreign support colloid, the calcium salt content of which is sufficiently large to justify their use in therapeutics.

A further object is to produce colloidal solutions of the type just referred to, which are insipid, substantially neutral and compatible with a large number of medicines, for instance opotherapic and other organ extracts containing amino-acids, that cannot be employed together with ionizable calcium salts.

A still further object of this invention is to produce by means of a flocculation, from the aforesaid solutions, a solid powdery, tertiary calcium phosphate having retained capability of again yielding with water colloidal solutions; for the sake of simplicity I shall refer to such a phosphate by terming it "colloidal" in order to indicate its capability of readily yielding colloidal solutions or pseudo-solutions when it is admixed with water. The latter feature is one of practical importance because, first, it enables of making a precise analysis of the colloidal salts employed and, secondly, it affords possibility for manufacturing pseudo-solutions as highly concentrated as desired.

Leaving aside any comparison between physical properties (such as size of micellae, stability of solutions and so on) which tend to prove the superiority of colloids manufactured in accordance with this invention, I point out that from the standpoint of practical use, the new products involve an advantage over analogous calcium products of the type above described, for the simple reason that they eliminate the difficulties involved in use of a support colloid.

As a matter of fact, the presence of a proteid liable to alteration such as casein for instance, in colloidal calcium phosphate intended to be used as a medicine is not free from inconvenience. Even under the assumption that capability of storage can be secured, the applications of such a calcium casein or like complex body are necessarily restricted. It can scarcely be used otherwise than for peroral administration, in form of a solid powder, i. e. in a condition which always leaves uncertain the colloidal nature of the complex body employed.

Furthermore, the colloidal calcium phosphates associated with a support colloid which are used in therapeutics in form of previously prepared solutions or emulsions are commercially sold as medicines having a low calcium salt content (specifically below 1 per cent), the therapeutic use of which is perhaps not fully justified when they are perorally absorbed by such doses as are customary for medicine solutions.

The foregoing objections being borne in mind, it is a further object of my invention to provide colloidal solutions, which, apart from glycerol, consist solely of saline constituents, have a tertiary calcium phosphate content as high as desired and readily lend themselves to production of the various pharmaceutical forms of medicines, including forms suitable for injection purposes.

For producing colloidal solutions of tertiary calcium phosphate free from any support colloid, I preferably cause the said salt to be formed in gelatinous condition, in the absence of any strong electrolyte but in the presence of substances such as glycerol and a neutral or tertiary citrate of ammonium or a non-toxic organic base. When the gel thus produced is heated, it is converted to a fine colloidal solution or suspension which is very stable and may have a high content of tertiary calcium phosphate. By treating the said solution or suspension with alcohol, acetone or a mixture of both solvents, I obtain a flocculent precipitate which after centrifuging and drying in the cold, is capable of dissolving again in water or in a solution of tertiary citrate with production of a pseudo-solution.

In order that my invention be clearly understood, I shall presently describe a specific example which should not be construed, however, as having any limiting character.

*Production of a tertiary calcium phosphate colloidal solution*

I use the following reactants:

(a) Concentrated solution of primary calcium phosphate in citric acid:

337.5 grams (1.25 mol.) of $(PO_4H_2)_2 Ca.2H_2O$ are vigourously stirred in the cold, until solution takes place, into 715 cubic centimeters of a molecular solution of citric acid (i. e. a solution containing 210 grams of said acid per liter, so that the 715 cubic centimeters include about 150 grams of citric acid). The solution is then made up to one liter by adding distilled water. The syrupy solution is capable of storage in the cold for an indefinite period without suffering any alteration.

(b) Calcium glycerate solution:

After protracted experiments, I have found it preferable to proceed as follows:

5 liters of neutral glycerol or 30° Bé. are placed in the container of a powerful mixer, and 500 grams of finely divided quicklime prepared from marble are added thereto; the container inner wall should be made of a material resistant to alkalis; for instance it may be enameled. Immediately after a proper mixing has been made, 3 liters of distilled water are added by successive portions; as temperature rapidly increases, is kept in the neighbourhood of 40° C. by adding a fresh portion of said water whenever necessary. The whole is then allowed to cool while still stirring and the fine suspension is allowed to stand for 24 hours. It is thereafter freed from any excess of calcium hydroxide by being vigorously centrifuged. The content of the final clear liquid in $Ca(OH)_2$ varies around seven per cent.

(c) Aqueous solution of monoethanolamine, containing 500 grams of base per liter.

(d) Molecular aqueous solution of tertiary monoethanolamine citrate (393 grams per liter).

For obtaining a colloidal solution of tertiary calcium phosphate from the above reactants, I proceed as follows:

1000 cubic centimeters of solution (a), containing 1.25 mol of primary calcium phosphate are poured into an enameled tank having an inner capacity of six liters, provided with a lid and positioned below a device capable of securing a vigorous stirring. As hereinbefore stated, the solution contains 150 grams of citric acid. About two-thirds of the acid are saturated by adding 180 cubic centimeters of solution (c) which is a 50 per cent strength solution of monoethanolamine. A gelatinous precipitate occurs at first but it disappears as stirring proceeds. Into the solution which is now clear, 500 cubic centimeters of reactant (d), i. e., of molecular solution of tertiary monoethanolamine citrate are poured; then, while still vigorously stirring, 4,073 cubic centimeters of reactant (b), specifically a calcium glycerate solution containing 185 grams (2.5 mol) of $Ca(OH)_2$ for reacting with substantially all of the phosphoric acid. The last portions of the said calcium glycerate solution cause production of a gel which is broken by continued agitation. Finally, a fresh amount of solution (c) sufficient to render the medium decidedly alkaline (pH value, about 7.5) is added; the necessary amount is slightly in excess of 90 cubic centimeters. If need be, the whole is stirred, say with a wood spatula, to render it wholly homogeneous.

The tank is then shut and positioned in a steam heated autoclave wherein it is kept for about an hour at a temperature of 110–120° C. The jelly has thus been converted to a solution exhibiting the characteristic opalescence of fine colloidal suspensions. The hot liquid is filtered and, if necessary, its pH-value is brought to the neighbourhood of neutrality (say 6.8) by means of a few drops of citric acid molecular solution.

The volume of the solution is equal to 5 liters and its tertiary calcium phosphate content, assuming that the whole calcium hydroxide has been bound by phosphoric acid, is equal to 7.75 per cent.

*Production of solid tertiary calcium phosphate*

I have found that from a solution prepared in accordance with the foregoing example, it is possible to separate tertiary calcium phosphate, by means of flocculation in the form of a solid powder which is still capable of readily yielding colloidal solutions. The treatment is as follows:

The colloidal solution is treated by four times its volume of an acetone alcohol mixture containing three parts of acetone and two parts of alcohol. A compact precipitate rapidly settles to the bottom of the vessel. After standing for some hours, the supernatant liquor is siphoned off and replaced by alcohol of 96% (about 4 times the estimated weight of precipitate). The whole is then worked up and left at rest for 12 hours. After said period, it is easy to separate, by filtering in a centrifugal device having a filter, a granular sediment which is washed once on the extractor fabric with an amount of alcohol equal to its estimated weight. By rapidly rotating the centrifugal device, possibly with the help of a hot air stream, the product is dried. The dry powder thus obtained is white; it is capable of being wholly dissolved in water owing to the tertiary citrate it has retained during its manufacture, as may easily be ascertained: as a matter of fact, should the dry powder be washed for a long time with a very large amount of alcohol of 96% until it exhibits but feebly the characteristic reaction of citric acid, its liability to yield a colloidal solution with water has disappeared.

However, should the powder thus washed be worked up with a concentrated solution of tertiary monoethanolamine citrate, it is again capable of yielding an aqueous colloidal solution.

From the solid tertiary calcium phosphate prepared as above described, it is possible to obtain pseudo-solutions having the desired content of tertiary calcium phosphate.

Provided the powder has been so prepared as to retain a sufficiently large amount of tertiary citrate, the pseudo solutions may contain up to 30 per cent, or still more, of tertiary calcium phosphate (calculated as dry phosphate).

Up to this time, I have not fully discussed the reason why the tertiary calcium phosphate is so readily adapted to produce with water ultrafine colloidal solutions in which the particles may be so fine as, for instance, to be no longer detectable with an ultra microscope. I suggest that the tertiary citrate which is present when the tertiary calcium phosphate is formed in the nascent state is probably adsorbed by the said phosphate and thus precludes production of large molecule aggregates or large micellae; this might be responsible for the fact that tertiary calcium phosphate produced in accordance with this invention but subsequently washed free from adherent substances can still yield a concentrated colloidal solution with water in the presence of added tertiary monethanolamine citrate while the conventional tertiary calcium phosphate powder is not capable of producing such concentrated colloidal solutions when worked up—as far as is practically possible—with a solution of monoethanolamine citrate. Hence the washed tertiary calcium phosphate exhibits novel properties probably due to its molecular arrangement, which are distinctive characteristics with respect to tertiary calcium phosphate found on the commercial market.

Having now set forth the nature of my invention with reference to a specific example so as to facilitate its understanding, I wish to point out that I do not restrict myself to the use of primary calcium phosphate in citric acid solution, as one of the reactants; instead, I may use a mixture of phosphoric acid and citric acid; however the former reactant should be preferred when particularly highly concentrated colloidal solutions are desired.

Again, for monoethanolamine, I may substitute ammonia or any organic base having a basic nitrogen atom but for pharmaceutical uses—which I have particularly in mind—innocuous organic bases should be selected for obvious reasons; thus, besides monoethanolamine, I may use, for instance, triethanolamine or piperazine, although chiefly from an economical standpoint, monoethanolamine is preferred.

Also, the sequence in which the reactants are brought into the reaction mixture may be altered without any detriment. Nevertheless, it is highly advisable to add calcium glycerate when monoethanolamine citrate is already present in the mixture, ir order to prevent precipitation of secondary calcium phosphate; otherwise the latter might separate out in solid condition, and it would be converted only with utmost difficulty into tertiary calcium phosphate under the operating conditions above set forth.

In practicing my method, care should be exercized to have a sufficient amount of tertiary monoethanolamine or like citrate in the reaction mixture.

Should it be insufficient, the liquefaction of the gel by heat proceeds with difficulty or may even not take place. On the contrary, when the amount of tertiary citrate in the mixture is increased the temperature at which the gel is liquified is lowered and liquefaction may be effected the water bath if the tertiary citrate concentration is sufficiently large. However, in practice, it may be advisable not to use a very large excess of tertiary citrate because difficulties may be experienced when flocculation takes place.

In the foregoing example, the reaction mixture includes 100 grams of tertiary monoethanolamine citrate per liter. This amount was empirically determined; on the one hand, it is sufficient for reliably obtaining fine pseudo-solutions under the working conditions set forth and, on the other hand, it promotes production, under influence of acetone-alcohol mixture, of a flocculent precipitate which can be easily isolated and purified.

As already stated, tertiary ammonium citrate may be used instead of tertiary monoethanolamine citrate. For pharmaceutical purposes, I prefer the latter citrate, because the pseudo-solutions manufactured by means of tertiary ammonium citrate are more viscid, contain particles of larger size and are less stable than those prepared by means of tertiary monoethanolamine citrate; also, difficulties may be experienced in working, owing to the presence of excess ammonia; however it will be understood that where viscid solutions, even containing relatively large colloidal particles are desired, the use of tertiary ammonium citrate may be resorted to.

Tertiary sodium citrate has proved useless by reason of its being a strong electrolyte.

Ammoniacal calcium chloride may be substituted for calcium glycerate when dilute colloidal solutions are to be produced; the results are less satisfactory if it is endeavoured to prepare concentrated solutions, probably because the said chloride is also an electrolyte.

I wish to point out that, although the foregoing example involves the use of glycerol (originally in the form of calcium glycerate solution), the influence of glycerol is not essential as is that of the tertiary citrate; hence the use of glycerol may be omitted; I prefer to use glycerol because I have ascertained that it exerts a favourable action on formation of the colloid. As a matter of fact, the colloidal solutions produced in the presence of concentrated glycerol solutions have much finer particles.

Generally speaking the new solutions exhibit physical properties (Tyndal effect, Brownian movement in solutions having sufficiently coarse particles and so on) which reveal their colloidal character; moreover the existence of tertiary calcium phosphate in the form of an ultra fine suspension can be evidenced by flocculation, not only by means of an alcohol-acetone mixture as above disclosed, but also by means of various electrolytes, particularly calcium chloride solutions. A sodium sulphate solution, although less active, may also cause gelification at elevated temperatures.

The flocculates thus produced may be easily dissolved again by adding tertiary ammonium, monoethanolamine and like citrates; colloidal solution is thus formed.

Ammonia has no action, whatever may be the excess amount added.

On the contrary acids, even weak acids, are strong coagulants for tertiary calcium phosphate colloidal solutions, apparently by reason of the electronegative character of the colloid. Hydrochloric acid produces at first a flocculate which dissolves again if an excess of said acid is added.

After protracted experiments, I have ascertained that the flocculate which is the most suitable for isolation in pure state is the one produced by adding alcohol or an alcohol-acetone mixture. Considering such a flocculate and setting apart phosphoric acid and calcium hydroxide, citric acid may be easily detected by Pinuera reaction with beta-naphtol, monoethanolamine may be detected by means of sodium hydroxide, and glycerol may be detected by its conversion to acroleine.

For instance, in an actual analysis, 5 grams of the powder were dissolved in distilled water, the volume was completed to 100 cubic centimeters, the solution was carefully filtered and the following estimations were made:

(a) Taking exactly 1 cubic centimeter of the solution, 10 cc. of water and 0.5 cc. of hydrochloric acid were added thereto. The colloid was dissolved, yielding a clear solution which was estimated by means of a titrated solution of uranium acetate. Found for $P_2O_5$, 34 per cent.

Calcium hydroxide was estimated by conversion into calcium sulfate. Found for $Ca(OH)_2$, 40.6 per cent.

Hence $$\frac{P_2O_5}{Ca(OH)_2} = \frac{34}{40.6} = 0.85$$

Calculated for $(PO_4)_2 Ca_3 = 0.844$

The figures expressing the respective amounts of $P_2O_5$ and $Ca(OH)_2$ show that the powder includes 74 per cent by weight of pure $(PO_4)_2 Ca_3$.

On the other hand, one gram of the powder was calcined; the mineral residue weighed 0.73 gram; hence the weight proportion to the original powder was 73 per cent, i. e. a figure which is satisfactorily in agreement with the above figure (74 per cent).

(b) For estimating monoethanolamine and tertiary citrate, 5 grams of the powder were treated in accordance with Kjeldhal's method, and ammonia thus formed was distilled. The amount of monoethanolamine thus found showed that the powder contained 11.2 per cent of tertiary monoethanolamine citrate.

(c) After standing for 3½ hours at a temperature of 110–120° C., the powder lost 8.2 per cent of its weight so that the amount of moisture was 8.2 per cent.

(d) The amount of glycerol may be found by difference; it was found 7.2 per cent. It may also be directly estimated by means of periodic acid; it was found equal to 8 per cent.

From the foregoing statements, it will be understood that I have provided colloidal solutions of tertiary calcium phosphate wherein the suspended particles or micellae are so fine as to wholly preclude any sedimentation, so that the solutions, even in very concentrated form, may be stored for an indefinite period of time without alteration although they include no colloid protective or support. A specific form which is very valuable for therapeutic administration of calcium and/or phosphorus is a concentrated colloidal solution containing, in addition to tertiary calcium phosphate, a tertiary citrate of a non-toxic base such as monoethanolamine and glycerol. I have also provided a composition of matter in the form of a white, fine powder which mainly consists of tertiary calcium phosphate, is readily adapted to form stable, homogeneous, colloidal solutions with water which may be brought exactly to the desired concentration, particularly to uncommon concentrations as high as 30 per cent or more of $(PO_4)_2 Ca_3$. Finally, I have provided particular methods for manufacturing the said colloidal suspensions and composition of matter.

I wish to point out that, while the use of my colloidal suspensions and compositions of matter has proved in actual experiments to be highly suitable for therapeutic purposes, I do not restrict myself to such application as the products may be used in other branches of technics, inter alia in view of the fact that highly concentrated solutions exhibit a syrupy, sticky character while being quite clear and pervious to light, nor do I restrict myself to the use of the pure solutions or powder as they may be associated in various forms with food products and medicines for peroral or other administration to living beings.

Hence, it should be understood that the present disclosure is for the purpose of illustration only, and that this invention includes all modifications and equivalents which fall within the scope of the appended claims.

What I claim is:

1. An aqueous colloidal solution free from any colloid support including colloidal tertiary calcium phosphate formed in the presence of a tertiary citrate of a base having a basic nitrogen atom.

2. A medicine comprising a stable aqueous solution free from any colloid support, which includes colloidal particles of tertiary calcium phosphate formed, in the nascent state, in a solution containing glycerol and a tertiary citrate of a non-toxic organic nitrogenous base.

3. An aqueous colloidal solution free from any colloid support including colloidal tertiary calcium phosphate formed in a solution containing tertiary monoethanolamine citrate.

4. An aqueous colloidal solution free from any colloid support including colloidal particles of tertiary calcium phosphate formed in a solution containing minor amounts of glycerol and tertiary monoethanolamine citrate.

5. A white powder free from any colloid support containing colloidal tertiary calcium phosphate formed in a solution containing minor amounts of glycerol and tertiary monoethanolamine citrate, said powder being adapted to yield with pure water a stable, homogeneous, substantially neutral solution wherein the tertiary calcium phosphate is present as ultrafine colloidal particles.

6. A white powder free from any colloid support adapted to yield with pure water a stable, homogeneous, substantially neutral, colloidal solution suitable for therapeutic purposes, said powder including about 74 per cent of colloidal $(PO_4)_2 Ca_3$, about 11 per cent of tertiary monoethanolamine citrate, about 7–8 of glycerol and the balance of water, said tertiary calcium phosphate having been formed in an aqueous solution in the presence of said citrate and said glycerol.

7. In the production of a tertiary calcium phosphate stable colloidal solution, the step which comprises forming tertiary calcium phosphate in nascent state and without production of strong electrolytes in an aqueous medium which includes a citrate of a base having a basic nitrogen atom in sufficient quantity to preclude precipitation of secondary calcium phosphate.

8. The process of claim 7, the medium further including glycerol.

9. The process of producing a tertiary calcium phosphate stable colloidal solution, which comprises forming tertiary calcium phosphate in nascent state and without production of strong electrolytes in an aqueous medium which includes a citrate of a base having a basic nitrogen atom in sufficient quantity to preclude precipitation of secondary calcium phosphate, thus forming a gel and heating said gel to convert it into a colloidal solution.

10. The process which comprises forming tertiary calcium phosphate in nascent state and without production of strong electrolytes in an aqueous medium which includes a citrate of a base having a basic nitrogen atom in sufficient quantity to preclude precipitation of secondary calcium phosphate, thus forming a gel, liquifying the gel by heat treatment to produce a colloidal solution, flocculating the colloidal solution to produce a precipitate and isolating the latter.

11. The process of claim 10, wherein flocculation is performed by means of a substance selected from the group consisting of alcohol, acetone and mixtures of alcohol and acetone.

12. A process of producing colloidal tertiary calcium phosphate which comprises forming said phosphate in an aqueous medium containing a sufficient amount of a tertiary citrate of a base having a basic nitrogen atom to preclude precipitation of secondary calcium phosphate by reacting together a glycerate of calcium and primary calcium phosphate in said medium.

13. In the production of tertiary calcium phosphate from primary calcium phosphate, the step which comprises adding calcium in the form of a glycerate, in substantially the molecular ratio for converting primary phosphates into tertiary phosphates, to an aqueous medium containing primary calcium phosphate together with so much monoethanolamine citrate as to preclude precipitation of secondary calcium phosphate.

14. A solid powdery substance containing colloidal tertiary calcium phosphate formed in an aqueous solution comprising a tertiary citrate of a base having a basic nitrogen atom, said substance being adapted to yield with pure water a stable, homogeneous, substantially neutral solution wherein the tertiary calcium phosphate is present as colloidal particles.

15. A solid powdery substance containing colloidal tertiary calcium phosphate and tertiary ammonium citrate, said phosphate having been formed in a solution containing said citrate; said powder being adapted to yield with pure water a stable, homogeneous, substantially neutral solution wherein the tertiary calcium phosphate is present as colloidal particles.

LOUIS PAUL VICTOR LECOQ.